J. ANDERSON.
STALK PULLER AND CHOPPER.
APPLICATION FILED JULY 12, 1918.

1,311,201.

Patented July 29, 1919.
3 SHEETS—SHEET 1.

Witnesses
J. T. L. Wright

Inventor
J. Anderson
By Victor J. Evans
Attorney

J. ANDERSON.
STALK PULLER AND CHOPPER.
APPLICATION FILED JULY 12, 1918.
1,311,201.
Patented July 29, 1919.
3 SHEETS—SHEET 2.
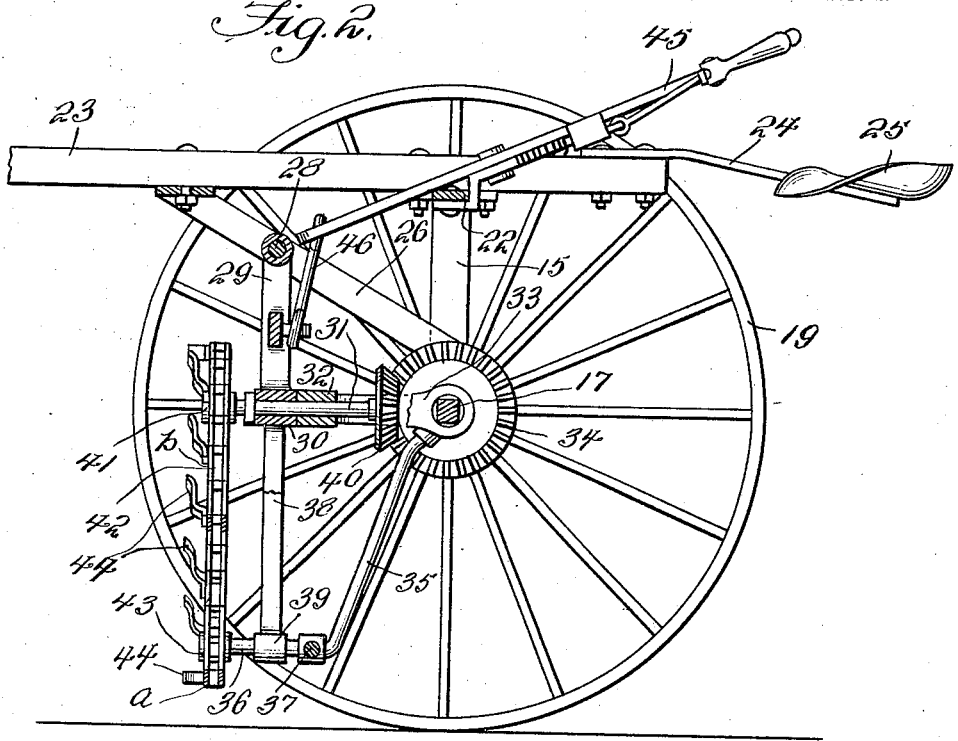
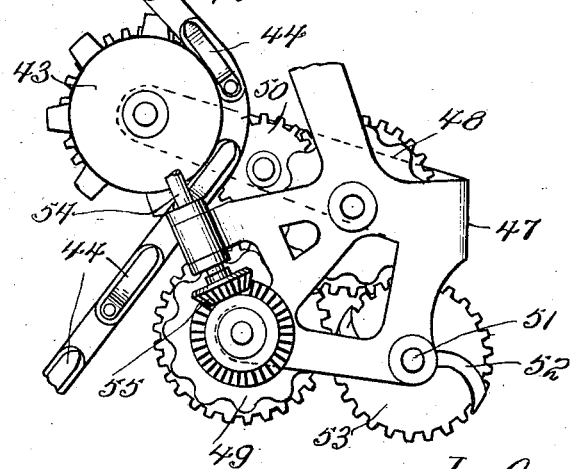
Witnesses
J. T. L. Wright
Inventor
J. Anderson
By Victor J. Evans
Attorney J. ANDERSON.
STALK PULLER AND CHOPPER.
APPLICATION FILED JULY 12, 1918.
1,311,201.
Patented July 29, 1919.
3 SHEETS—SHEET 3.
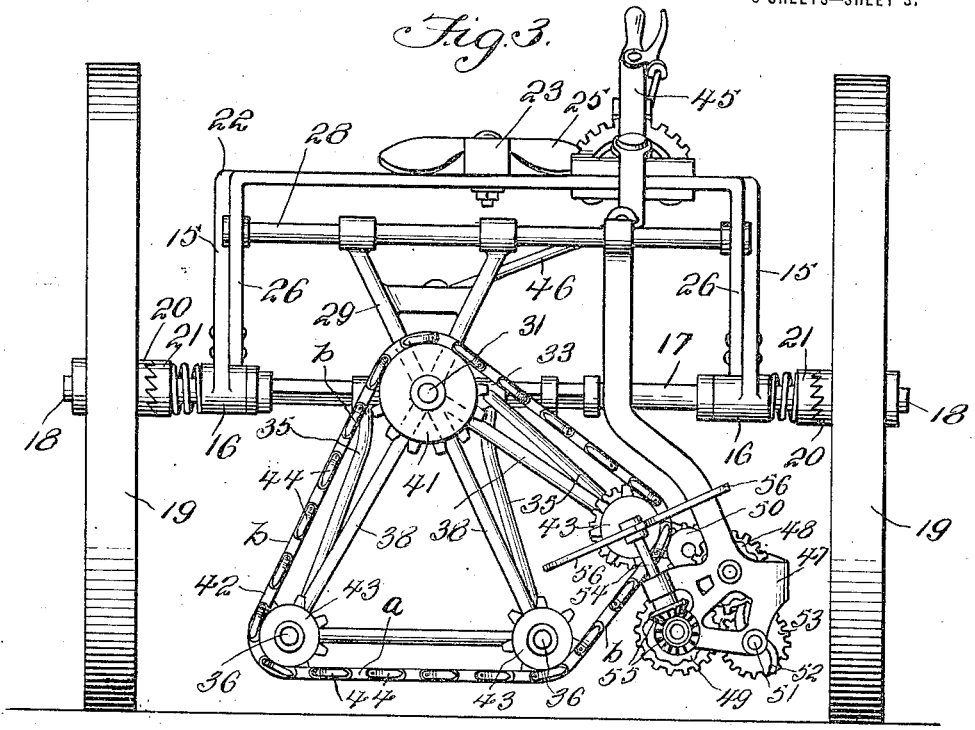
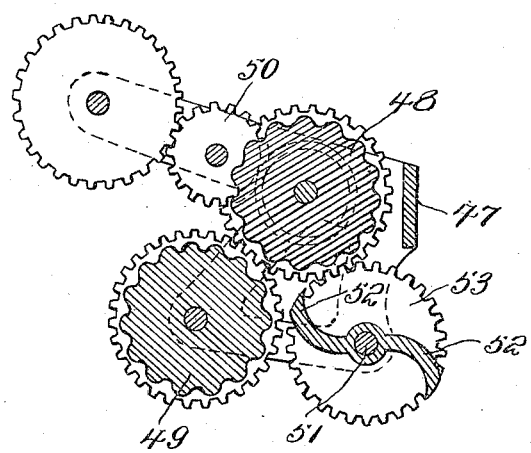
Witnesses
Inventor
J. Anderson
By Victor J. Evans
Attorney

UNITED STATES PATENT OFFICE.

JEFF ANDERSON, OF ATLANTA, TEXAS.

STALK PULLER AND CHOPPER.

1,311,201.   Specification of Letters Patent.   Patented July 29, 1919.

Application filed July 12, 1918. Serial No. 244,610.

*To all whom it may concern:*

Be it known that I, JEFF ANDERSON, a citizen of the United States, residing at Atlanta, in the county of Cass and State of Texas, have invented new and useful Improvements in Stalk Pullers and Choppers, of which the following is a specification.

This invention relates to stalk pullers and choppers.

The invention has for its object to produce an organized machine of simple and improved construction by the use of which stalks, such as corn stalks, may be pulled or extracted from the ground and chopped into small bits at a single operation, the small bits or pieces being dropped on the ground to be subsequently plowed under for fertilizing purposes.

A further object of the invention is to produce a simple and improved mechanism whereby the stalks will be seized, pulled from the ground and placed in engagement with a pair of feed rollers with which a chopping knife coöperates.

A further object of the invention is to simplify and improve the stalk feeding and chopping mechanism.

Further objects of the invention are to simplify the general construction and arrangement of the parts of the device and to so assemble the same with a carrying frame that the pulling and chopping mechanism may be moved transversely with respect to the frame to place said mechanism in the most advantageous position for successful operation.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings:

Fig. 2 is a side elevation of the same.

Fig. 3 is a front view.

Fig. 5 is a detail view in front elevation and on a larger scale of the feed rollers and the chopping mechanism.

Fig. 6 is a sectional detail view showing the chopping knives and the drive gearing adjacent thereto.

Corresponding parts in the several figures are denoted by like characters of reference.

Figure 1:
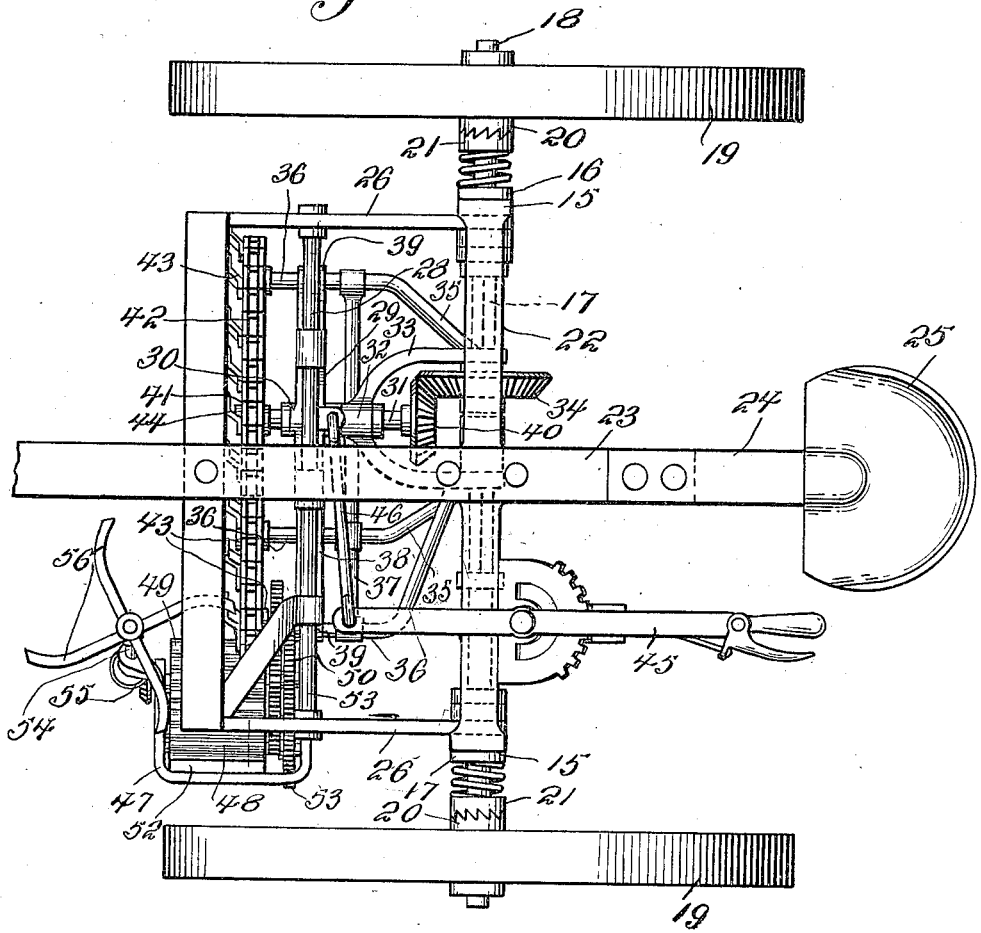
Figure 1 is a top plan view of a machine constructed in accordance with the invention.
Figure 4:
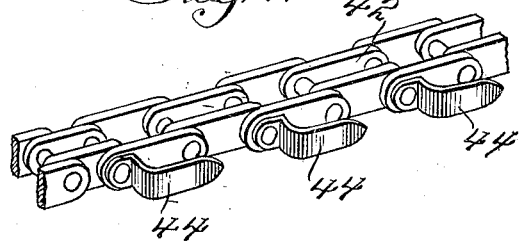
Fig. 4 is a perspective detail view of a portion of the stalk pulling chain.

The frame structure of the improved machine includes side members 15 having bearings 16 in which the axle 17 is mounted for rotation, said axle being provided with spindles 18 on which the ground wheels 19 are revolubly mounted, the hubs of the ground wheels being provided with clutch members 20 engaging spring actuated clutch members 21 on the axle whereby, when the machine is traveling in a forward direction, the axle will be rotated in its bearings while when the machine is moved in a rearward direction the wheels will revolve independently of the axle, such construction being well known and understood in various kinds of agricultural implements. The side members of the frame are connected by a cross bar 22 on which is supported the tongue 23 on which the spring 24 carrying the seat 25 is bolted or secured in the customary manner. The machine may be drawn by a team of draft animals for the attachment of which the usual means are to be provided such means being not shown in the drawings.

An auxiliary frame which is connected with the side members of the main frame includes forwardly converging side members 26 connected with the tongue 23, said side members supporting a track bar or rod 28 on which is slidably mounted a V-shaped yoke 29 the lower end of which affords a bearing 30 for a shaft 31, said shaft having an additional bearing indicated at 32 in a U-shaped yoke 33 which is slidably mounted on the axle 17 intermediate the bearings 16, that portion of the axle being of square cross section and free to revolve with respect to the yoke 33. Fitted on the axle intermediate the limbs of the yoke 33 is a bevel gear 34, the hub of which has a bore of a cross section corresponding with that of the axle so that the bevel gear will revolve with the axle when the latter revolves in the bearings provided for it in the limbs of the yoke 33. The forwardly converging side members 26 of the auxiliary frame also constitute braces whereby the main frame is connected with the tongue.

Securely connected with the yoke 33 at the sides thereof are downwardly and forwardly extending arms 35 the lower ends of which are provided with forwardly extending spindles 36 lying in an approximately horizontal plane. The arms 35 are connected together by a cross bar or brace 37 and said arms additionally reinforced by means of arms or braces 38 connected with the V-shaped yoke 29, extending and diverging downwardly with respect thereto and having terminal sleeves 39 engaging the spindles 36.

The shaft 31 carried by the yoke 29 is provided at its rear end with a bevel pinion 40 meshing with the bevel gear 34 so that when the machine is moving in a forward direction the shaft 31 will be constantly driven. Fixed on the shaft 31 is a sprocket wheel 41 over which passes a chain 42, said chain being also trained over the sprocket wheels 43 that are mounted for rotation on the spindles 36. The said chain will thus be guided in a triangular course presenting an approximately horizontal lower stretch $a$ and upwardly convergent side stretches $b$. Secured on the front faces of some or all of the chain links are hooks 44 all facing in one direction, the arrangement being such that the hooks on the links of the lower horizontal stretch of the chain will face in the direction of the chopping mechanism which will be presently described.

It will be seen that the yokes 29 and 33 together with the arms 35 and 38 and related parts combine to form a carriage which is slidably supported on the axle 17 and on the rod or track bar 28, said carriage serving to support the stalk-pulling chain 42 and the means for transmitting motion to said chain from the bevel gear 34 mounted on the axle, said bevel gear partaking of the sliding movement of the carriage. For the purpose of effecting the proper adjustment of the carriage a hand lever 45 and suitable connecting means 46 are to be provided as well as suitable means of well known construction for retaining the parts in position at various adjustments.

The carriage is provided with suitable supporting means including a bracket 47 for the stalk feeding and chopping mechanism which includes two feed rollers 48, 49 which are suitably carried together and one of which is positively driven by motion transmitted through the medium of a spur wheel 50 which is operatively connected with one of the sprocket wheels 43. A shaft 51 carrying chopping knives 52 is equipped with a spur wheel 53 which receives motion from one of the feed rollers, the gearing being obviously arranged in such a manner that the parts will be driven in the proper direction. The feed rollers 48, 49 and the shaft 51 are obviously disposed in parallel relation and each in an approximately horizontal plane. Supported for rotation in a vertical plane and adjacent to the front ends of the feed rollers and the chopper carrying shaft is a perpendicular shaft 54 driven by bevel gearing 55 and carrying a reel comprising radially extending curved arms 56, said arms constituting beaters which will assist in placing the corn stalks in engagement with the feed rollers.

From the foregoing description taken in connection with the drawings hereto annexed the operation and advantages of this invention will be readily understood. When the machine advances over the field it will be drawn by two horses walking on either side of the row of stalks. The stalks will be engaged by the hooks on the links of the lower stretch of the chain and will thereby be pulled from the ground and carried in the direction of the feed rollers. When a stalk approaches the feed rollers coming within reach of the reel or beater the arms of which will disengage the stalk from the hook of the chain and carry it in engagement with the feed rollers which will then seize the stalk and feed it to the cutting device whereby the stalk will be chopped in small pieces dropping on the ground. The entire pulling and cutting or chopping mechanism is mounted on the carriage which is free to move on the axle 17 and the track bar 28 so that the entire device will be under the full control of the operator who by means of the lever 25 may place it in the most convenient position for successful operation.

Having described the invention, what I claim as new is:

1. In a machine of the class described, the combination with a revoluble axle and ground wheels carried thereby, of a carriage slidably supported with respect to the axle, a chain mounted on the carriage for movement in a substantially vertical plane, said chain having links provided with stalk-pulling hooks and means for transmitting motion from the axle to the chain.

2. In a machine of the class described, a frame structure including an auxiliary frame having a track bar, a revoluble axle supporting the frame structure, a carriage supported slidably on the axle and the track bar, a chain mounted on the carriage for movement in an approximately vertical plane, said chain having links provided with stalk-pulling hooks and means for transmitting motion from the axle to the chain.

3. In a machine of the class described, a frame structure, a revoluble axle supporting the same, a carriage supported slidably by the axle and the frame structure, a driven stalk-pulling chain mounted on the carriage and stalk feeding and chopping means also mounted on the carriage for coöperation with the stalk-pulling chain.

4. In a machine of the class described, a frame structure including a track bar, a revoluble axle supporting the frame structure, a carriage comprising yokes slidably engaging the track bar and the axle respectively and members whereby said yokes are operatively connected, said carriage including spindles disposed in an approximately horizontal plane and said yokes having bearing members disposed in longitudinal alinement, a horizontal shaft supported for rotation in said bearing members, intermeshing gears on the horizontal shaft and on the axle, the gear on the axle being arranged between the limbs of the yoke on said axle and slidable therewith, a sprocket wheel fixed on the horizontal shaft, sprocket wheels mounted revolubly on the spindles and a chain trained over said sprocket wheels and having links provided with stalk-pulling hooks.

5. In a machine of the class described, a frame structure including a track bar, a revoluble axle supporting the frame structure, a carriage comprising yokes slidably engaging the track bar and the axle respectively and members whereby said yokes are operatively connected, said carriage including spindles disposed in an approximately horizontal plane and said yokes having bearing members disposed in longitudinal alinement, a horizontal shaft supported for rotation in said bearing members, intermeshing gears on the horizontal shaft and on the axle, the gear on the axle being arranged between the limbs of the yoke on said axle and slidable therewith, a sprocket wheel fixed on the horizontal shaft, sprocket wheels mounted revolubly on the spindles and a chain trained over said sprocket wheels and having links provided with stalk-pulling hooks; and means whereby the carriage and the parts carried thereby may be moved longitudinally on the axle and the track rod and secured at various adjustments.

6. In a machine of the class described, a frame structure including a track bar, a revoluble axle supporting the frame structure, a carriage comprising yokes slidably engaging the track bar and the axle respectively and members whereby said yokes are operatively connected, said carriage including spindles disposed in an approximately horizontal plane and said yokes having bearing members disposed in longitudinal alinement, a horizontal shaft supported for rotation in said bearing members, intermeshing gears on the horizontal shaft and on the axle, the gear on the axle being arranged between the limbs of the yoke on said axle and slidable therewith, a sprocket wheel fixed on the horizontal shaft, sprocket wheels mounted revolubly on the spindles and a chain trained over said sprocket wheels and having links provided with stalk-pulling hooks; in combination with stalk feeding rollers and a chopping device also carried by the carriage for coöperation with the stalk-pulling chain.

7. In a machine of the class described, a frame structure including a track bar, a revoluble axle supporting the frame structure, a carriage comprising yokes slidably engaging the track bar and the axle respectively and members whereby said yokes are operatively connected, said carriage including spindles disposed in an approximately horizontal plane and said yokes having bearing members disposed in longitudinal alinement, a horizontal shaft supported for rotation in said bearing members, intermeshing gears on the horizontal shaft and on the axle, the gear on the axle being arranged between the limbs of the yoke on said axle and slidable therewith, a sprocket wheel fixed on the horizontal shaft, sprocket wheels mounted revolubly on the spindles and a chain trained over said sprocket wheels and having links provided with stalk-pulling hooks; in combination with stalk-feeding rollers and a chopping device also carried by the carriage for coöperation with the stalk-pulling chain, and a driven reel coöperating with the feed rollers of the stalk-pulling chain.

In testimony whereof I affix my signature.

JEFF ANDERSON.

Copies of this patent may be obtained for five cents each, by addressing the "Commissioner of Patents, Washington, D. C."